G. M. CHARLES.
FAUCET.
APPLICATION FILED DEC. 12, 1912.
1,093,533.
Patented Apr. 14, 1914.
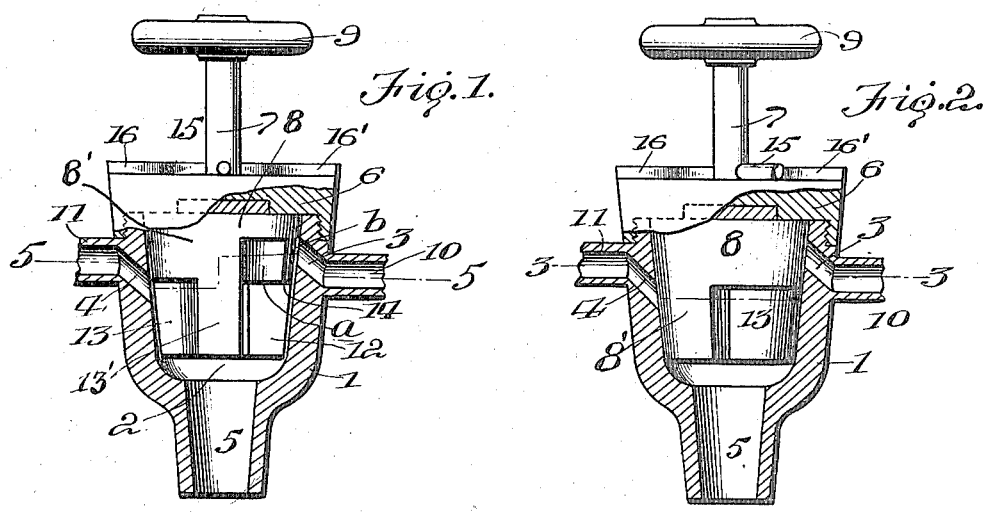
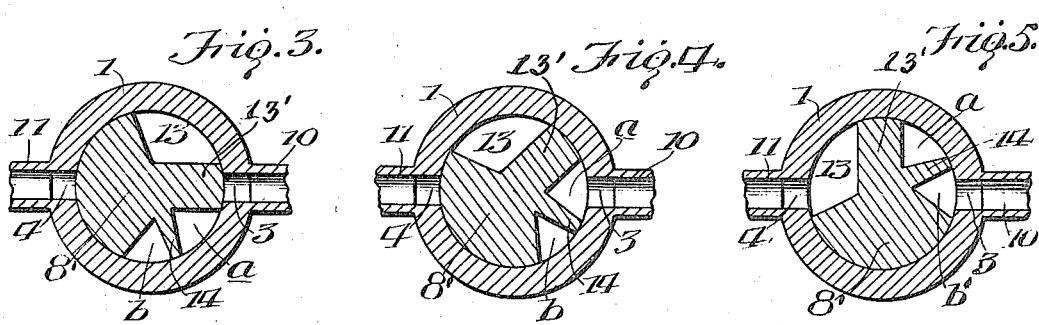
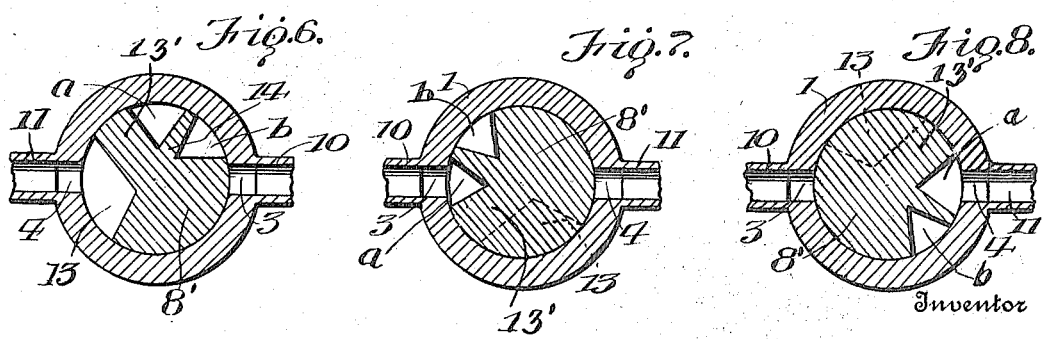
Witnesses
Inventor
G. M. Charles
By H. N. Jenkins
Attorney

UNITED STATES PATENT OFFICE.

GEORGE MEADE CHARLES, OF WASHINGTON, DISTRICT OF COLUMBIA.

FAUCET.

1,093,533.  Specification of Letters Patent.  Patented Apr. 14, 1914.

Application filed December 12, 1912. Serial No. 736,335.

*To all whom it may concern:*

Be it known that I, GEORGE MEADE CHARLES, citizen of the United States, residing at Washington, in the District of Columbia, have invented new and useful Improvements in Faucets, of which the following is a specification.

The invention relates generally to faucets, but more particularly to bath and beer faucets; and it consists of a shell having a valve-chamber provided with hot and cold water inlets, and a single outlet, and a novelly-constructed valve, by means of which various quantities of hot or cold water, or a mixture of hot and cold water, may be discharged through the single outlet.

In the drawings Figure 1 is a vertical section, partly in elevation, of my improved faucet, showing the valve in position to discharge a mixture of hot and cold water; Fig. 2, a similar view, showing both inlets closed; Fig. 3 a horizontal section on line 3—3 of Fig. 2, the faucet being turned end for end, and looking down toward the top of the device; Fig. 4, a similar view, showing the valve in a position to discharge hot water, the view being taken same as Fig. 3; Fig. 5, a horizontal section on line 5—5 of Fig. 1, with the faucet in inverted position and looking downward; Fig. 6, a similar view, showing the valve in position to discharge cold water, the view being also taken in the inverted position of the faucet, and looking downward, and Figs. 7 and 8 horizontal sections, showing the faucet arranged to draw beer, the casing being reversed; Fig. 7 showing the valve in position to draw one kind of beer, the duct 3 being in communication with port $a$, and Fig. 8 showing the valve in position to draw another kind of beer, the duct 4 being in communication with port $a$.

Referring to the several views, the numeral 1 indicates a body or shell provided with a valve-chamber 2; a hot water duct 3; a cold water duct 4, and a common outlet or discharge opening 5. The duct 3 opens into the valve-chamber in an upwardly-inclined direction and the duct 4 opens into said chamber in a downwardly-inclined direction, the object of which will be hereinafter explained. The upper end of the shell is screw-threaded to receive a screw-threaded cap 6, centrally perforated for the passage of the stem 7 of a valve 8, said stem being provided with an operating handle 9. The shell is provided with hot and cold water service pipes 10 and 11 respectively.

The valve 8 is provided with vertical ports 12 and 13 separated by cut-off portions 8' and 13' of different widths, the port 12 being divided for a portion of its length by a partition 14 into ports $a$ and $b$ respectively. The port 13 extends approximately midway the length of the valve, and hence the downward inclination of the duct 4, but the duct 3 being upwardly inclined the ports $a$ and $b$ extend to near the upper end of the valve. This construction of the ports $a$ and $b$ permits varying quantities of hot water to be drawn through the duct 3, and by a slight turning of the valve so as to cause the partition 14, (see Fig. 5) to partly cover the duct 3 a lesser quantity of hot water may be drawn, in which case the solid portion of the valve will partly cover the duct 4, the partition serving to regulate the quantity of hot water entering the ports $a$ and $b$.

In drawing a mixture of hot and cold water, the valve is turned until port $b$ registers with duct 3, in which position port 13 will be in register with the duct 4, as shown in Fig. 5. In drawing hot water only the port $a$ is brought in register with the duct 3, the port 13 then being out of communication with the duct 4, as shown in Fig. 4, and if it is desired to draw cold water only port 13 is brought in register with the duct 4, and the other port moved out of register with the duct 3, as shown in Fig. 6, but it will be evident that port $a$ may be brought in register with the duct 4 and the duct 3 still remain closed.

The movements of the valve are limited by pin 15 arranged on the valve-stem to move between two stops 16 and 16', one each side of the valve-stem, and when both ducts, 3 and 4, referring to Figs. 1 to 6 inclusive, are closed see Figs. 2 and 3, the pin may be against either stop; as shown in Fig. 2 it is against stop 16. By turning the handle 9 in the direction of stop 16' until the pin has reached about one-quarter of the distance between the two stops, the port $a$ will be brought into communication with the duct 3, as shown in Fig. 4, drawing hot water, a further turn of the handle toward stop 16' until the pin has reached about midway between the two stops, the port $b$ will be in communication with the duct 3 and the port 13 in communication with duct 4, as shown in Fig. 5, drawing a mixture of hot and cold water, and by turning the handle, in the same direction, until the pin reaches about three-quarters of the distance between the stops, the port 13 will be in communication with the duct 4, the solid portion of the valve closing duct 3, as shown in Fig. 6, drawing cold water. By turning the handle the remainder of the distance, until the pin strikes the stop 16', both ducts 3 and 4 will be closed. A reversal of the operation, the first quarter turn toward stop 16 will draw cold water; the second turn a mixture of hot and cold water, and the third turn hot water, the completed turn bringing the pin against the stop 16, closing both ducts.

It will be obvious that the faucet is adaptable for drawing beer by reversing the casing, changing the respective positions of the ducts 3 and 4, as shown in Figs. 7 and 8, for by manipulating the valve so as to utilize only the ports $a$ and $b$ two different kinds of beer may be drawn, one kind being drawn through the duct 4 by causing the port $a$ or $b$ to register with said duct 4, the solid portion of the valve closing the duct 3, as shown in Fig. 8, and another kind of beer may be drawn by causing said port $a$ to register with duct 3, the duct 4 being closed by the solid portion of the valve, as shown in Fig. 8. The arrangement or position of the valve in Figs. 7 and 8, is such that duct 3, owing to its upward inclination, cannot be brought in register with the port 13, hence the danger of mixing the beers is prevented.

It will be obvious that the partition 14 may be extended the entire length of the port 12 without departing from the scope of my invention.

Having thus fully described my invention, what I claim, is:

1. A faucet, comprising a body provided with a valve-chamber, an upwardly-inclined inlet duct for hot water, a downwardly-inclined inlet-duct for cold water, a common outlet, and a valve provided with a port extending nearly the entire length of the valve, and a port of lesser length, whereby cold water may be drawn through either port.

2. A faucet, comprising a body provided with a valve-chamber, an upwardly-inclined inlet-duct, a downwardly-inclined inlet-duct, a common outlet, and a valve provided with a divided port, whereby liquid may be caused to pass through one division of said divided port, from said upwardly-inclined duct, while the downwardly-inclined duct is closed.

3. A faucet, comprising a body having a valve-chamber, an upwardly-inclined duct for hot water, a downwardly-inclined duct for cold water, a common outlet, and a valve provided with a port extending nearly its entire length, and a port extending midway its length, said ports being separated by cut-off portions of different widths, whereby hot and cold water may be cut off at the same time, the longer port being divided into smaller ports, so that the liquid may be caused to pass through one of the small ports from the upwardly-inclined duct when the downwardly inclined duct is closed.

In testimony whereof, I have hereunto set my hand this 22 day of November A. D. 1912.

GEORGE MEADE CHARLES.

Witnesses:
H. N. JENKINS,
T. M. JENKINS.